Patented Dec. 23, 1952

2,623,029

UNITED STATES PATENT OFFICE 2,623,029

PRODUCTION OF STABLE THERMOSETTING COMPOSITIONS

William C. Dearing, Pittsburgh, Pa., and Arthur M. Howald, Perrysburg, Ohio, assignors to Libbey-Owens-Ford Glass Company, Toledo, Ohio, a corporation of Ohio No Drawing. Continuation of application Serial No. 575,732, February 1, 1945. This application March 23, 1951, Serial No. 217,294

3 Claims. (Cl. 260—40)

The invention relates to a stable composition which is thermosetting (i. e. which is hardened into an infusible product by heating) and which contains a polymerization catalyst and a binder consisting of a compound that is polymerizable to an infusible resin.

A compound that forms a synthetic resin by polymerization has the advantage that no by-product is formed in the polymerization reaction. However, for many years the synthetic resins obtainable by polymerization were fusible resins. Articles made of a fusible resin cannot be used at temperatures above or near the fusion point of the resin. It is a general property of fusible resins that they are not very inert and are attacked by various solvents so that they are lacking in resistance and durability.

Infusible phenol-formaldehyde and urea-formaldehyde resins have been known for many years, but such resins are produced by condensation reactions in which volatile by-products are formed. The formation of volatile by-products during the production of a phenol-formaldehyde or urea-formaldehyde resin makes it necessary to take precautions to prevent such by-products from producing flaws in articles formed of the resin. Moreover, the phenol-formaldehyde and urea-formaldehyde products which form infusible resins have the disadvantage that they are solid, non-plastic products at ordinary temperatures. The temperatures at which such products fuse so as to become plastic are only slightly below the temperatures at which they undergo rapid transformation into infusible resins. These products can be shaped only while they are in a fused condition, and their failure to reach a fused state at temperatures substantially below their hardening temperatures is a great handicap in fabricating operations. By the time a urea-formaldehyde or phenol-formaldehyde product has reached a fused state in a fabricating operation, it already has begun to harden to an infusible resin, and such hardening interferes with the shaping and molding of the product.

Certain materials are now known which have the advantage that they form infusible resins and also have the advantage that they form such resins by polymerization rather than by condensation. They also have the advantage that they are fused (and can therefore be shaped) at temperatures far below the temperatures at which their hardening to the infusible state is rapid. It is a general characteristic of these materials that each of their molecules contains at least two polymerizable double bonds. The best known materials of this type are allyl derivatives and unsaturated polyesters which polymerize to infusible resins. The saturated polyesters or alkyds previously known formed infusible resins by condensation reactions in which water was eliminated. The formation of water during the condensation of such alkyds prevented the production of molded articles or other solid bodies from the alkyds because it was impossible to eliminate water from the interior of a solid body in order to permit hardening to take place.

In spite of these important advantages of the materials that are now known which polymerize to infusible resins, their commercialization has been seriously impeded by the fact that such polymerizable materials are not stable after the addition of the polymerization catalyst that is necessary to cause polymerization to take place. In the manufacture of commercial products from such materials, polymerization in the presence of a polymerization catalyst ordinarily is carried out at an elevated temperature in order to cause the polymerization to take place rapidly. After the addition of a polymerization catalyst to such materials, however, polymerization proceeds slowly at ordinary temperatures. The rate of polymerization at ordinary temperatures after the incorporation of the polymerization catalyst is rapid enough so that the material becomes substantially unusable in about two or three days. During that period of time the polymerization progresses so far at ordinary temperatures that the material is substantially infusible and therefore consists of a worthless mass that cannot be formed into any useful product.

Since materials that are polymerizable to infusible resins become worthless about two or three days after the incorporation of a polymerization catalyst, the catalyst cannot be incorporated by the manufacturer of such a material but must be added by the user just before the material is used. The useful life of the material after incorporation of a polymerizable catalyst is so short that it does not afford sufficient time for a manufacturer to ship the catalyst-containing material to a user.

For these reasons it heretofore has been the invariable practice for the user rather than the manufacturer of the material to add the required proportion of catalyst. The necessity for this practice has tended to restrict the use of these valuable polymerizable materials to large users. The minute proportion of polymerization catalyst required for a small batch of the material must be weighed out very accurately and then incorporated very uniformly throughout the batch. In the case of a small custom molder, the batch might be small enough so that the correct amount of polymerization catalyst would have to be weighed on an analytical balance. In the case of a small user, the relatively great expense and the risk of error in weighing out and incorporating the catalyst had the effect of prohibiting the use of the valuable new materials that are polymerizable to infusible resins.

The principal object of the invention is the production of a thermosetting composition which contains a polymerization catalyst and a binder that is polymerizable to an infusible resin and which is stable at ordinary temperatures. More specific objects and advantages of the invention are apparent from the description, which merely discloses and illustrates the invention and is not intended to impose limitations upon the claims.

Since a thermosetting composition embodying the invention does not require incorporation of a catalyst by the user, it can be used by small fabricators who have been unable heretofore to make use of thermosetting polymerizable materials and can be used more economically by large fabricators than thermosetting polymerizable materials requiring the addition of a catalyst by the user.

It is stated in U. S. Patent No. 2,255,313 that certain thermosetting polymerizable materials containing a polymerization catalyst can be rendered stable by merely incorporating a filler into the materials.

That statement now has been found to be incorrect. It has been established that the mere incorporation of a filler in such polymerizable materials containing a polymerization catalyst does not appreciably retard the polymerization of the materials at ordinary temperatures. When an attempt is made to stabilize such a polymerizable material containing a polymerization catalyst by mere incorporation of a filler, polymerization continues at ordinary temperatures unless the material is already so far polymerized as to be commercially worthless or unless the material does not contain a proportion of catalyst sufficient to make it commercially usable, so that if the material is usable at the time of the incoporation of the filler it becomes unusable within a few days.

In accordance with the present invention, a stable thermosetting polymerizable material containing a polymerization catalyst is produced by preparing the material in a novel and abnormal physical state.

In their normal physical state, thermosetting polymerizable substances are viscous liquids. Patent No. 2,255,313, in describing the preparation of molding compositions from such materials, states:

"By proportioning the filler and in other ways . . ., molding compositions ranging from viscous liquids or soft pasty masses to almost dry powders may be obtained."

The only such composition which is described as a powder in the examples of the patent is the compositiin described in Example 1 as a "soft, crumbly, damp powder." Even a "damp powder" such as that described by the patent coalesces into a solid because of the tacky character of the binder contained therein, and becomes packed into the form of a dense mass whenever it is placed in a container.

It now has been found that the polymerization of thermosetting polymerizable materials is inhibited by air. Heretofore, however, inhibition of the polymerization of such materials by air has been found to take place only in thin surface coatings or films exposed to air.

The present invention is based upon the discovery that the phenomenon of inhibition of polymerization of such materials by air can be used to effect stabilization at ordinary temperatures throughout a bulk or mass of such material, even though the material contains the proportion of a polymerization catalyst that it is neecssary to employ in fabricating operations.

In the practice of the invention the inhibiting action of air upon the polymerization of a thermosetting polymerizable material containing a polymerization catalyst is made use of by preparing such a material in a novel physical state in which such a material has not heretofore been prepared. A stable thermosetting composition containing a polymerizable binder whose polymerization is inhibited by air is produced in accordance with the invention by preparing a composition, comprising the binder and a catalyst selected from the class consisting of organic peroxides and organic ozonides, in a finely divided state with air diffused throughout the mass.

Ordinarily it is commercially undesirable to produce a solid composition in the form of a fine power, because a fine powder produces dusty conditions which are annoying, and is fluffy, difficult to handle, and much more bulky than a coarse granular material. Thus it is customary to manufacture solid materials in coarse granular form and particularly so in the case of molding compositions. A finely powdered molding composition contains air which causes an inconvenience to the molder by requiring him to "breathe" the mold to eliminate the air during a molding operation. In the manufacture of a molding composition that normally would be in the form of a fine powder, it is therefore customary for the manufacturer deliberately to convert the fine powder into coarse particles by an additional manufacturing operation called "granulation" carried out on the material prior to storage or shipment.

A composition containing a thermosetting polymerizable substance is not normally obtained in finely divided form because such substances normally are viscous liquids. A thermosetting composition containing a polymerizable binder and a polymerization catalyst prepared in accordance with the invention in a finely divided state with air diffused throughout the mass has the extraordinary advantage of stability at ordinary temperatures which far outweighs the ordinary disadvantages of a finely divided composition enumerated above.

After a thermosetting composition has been prepared in accordance with the invention in a finely divided state with air diffused throughout the mass, it remains stable even though it is kept in an air tight container. Storage of the composition in an air tight container may be necessary in some cases to prevent the loss of a volatile constituent or to exclude moisture.

As used herein, the term "finely divided" means sufficiently finely divided so that the material is permeated by the air that is present in the mass. Obviously, the particles of the material, in order to be permeated by the air, must be smaller if the material is in the form of a dense putty than if the material is absorbed upon a porous filler or is in the form of thin flakes. The essential physical characteristic of a material produced in accordance with the invention is that it is permeated by air. The particles of a material embodying the invention that is kept spread out on trays may have a diameter of 1/16".

Although thermosetting polymerizable materials are normally in the form of viscous liquids, it has been found that in the practice of the present invention certain thermosetting polymerizable materials, by special treatment, can be made hard enough so that they can be ground, at least after being mixed with proper fillers. Such a material, in the practice of the invention, may be reduced by grinding to a finely divided state with air diffused throughout the mass.

One material that can be made hard enough to be ground, at least in the presence of a filler, is an unsaturated polyester obtained by reacting equal mols of ethylene glycol and maleic anhydride. Fumaric acid may be used in place of the maleic anhydride if desired. Such a polyester may be hard enough to grind when the esterification has been carried to an acid number of about 30. This polyester is unusual in that it tends to crystallize upon standing. In the preparation of the polyester a small proportion, for example about 10%, of the ethylene glycol or the maleic anhydride or fumaric acid may be replaced by an equivalent amount of another polyhydric alcohol or polybasic acid. A filler preferably is employed with such a polyester because the impregnated filler can be ground much more easily than the polyester alone. Grinding of a filler so impregnated is possible even when from about 20% to about 30% of the polyester has been replaced by a diallyl ester of high boiling point.

In some cases it may be necessary to employ refrigeration in order to render the material hard enough to be ground, particularly when it is desired to cause the material to crystallize before grinding is carried out. Ordinarily, however, grinding under refrigeration does not produce the desired result unless the material is quite hard at ordinary temperatures because the particles of a material that is not hard at ordinary temperatures tend to coalesce into a solid mass. The preferred grinding apparatus for performing such an operation is one of the well-known types employing a comminutor having a cutting or chopping action, as distinguished from a ballmill or other crushing type of apparatus in which the material might be wadded together instead of being ground.

If the binder is hard so that the material may be ground the proportion of filler may be as low as desired or the filler may be omitted altogether. In any case the proportion of filler may be as large as it is possible to employ while still permitting the material to be held together by the binder in the form of a coherent finished article. The maximum proportion of filler that can be employed depends upon the absorbency of the filler, because an absorbent filler reduces the apparent proportion of binder by absorbing some of the binder.

The inhibition of the polymerization of a thermosetting polymerizable material by air disappears when the material is heated above a certain temperature. For example the polymerization of an unsaturated polyester is not appreciably inhibited by air at temperatures higher than about 180° F. Thus although a composition embodying the invention is stable at ordinary temperatures because of inhibition of the polymerization by air, the composition may be polymerized very rapidly by heating it to a temperature above the range in which polymerization is inhibited by air. Fabrication of a composition prepared in accordance with the invention may be carried out at lower temperatures by the use of an apparatus that excludes air from the material during the fabricating operation. In the fabrication of articles from molding compositions embodying the invention by means of ordinary molding apparatus, air may be removed at the beginning of the molding operation by "breathing" or "bleeding" the mold, and air is excluded during the remainder of the operation of molding the composition under pressure in a closed mold so that inhibition of the polymerization by air does not take place.

An important advantage of a composition embodying the invention is that the inhibiting effect of air may be obviated during the fabrication of products from the composition as explained above by employing an elevated temperature or by excluding air from the composition fabricated at an intermediate temperature. An inhibiting agent, in contrast, cannot be used satisfactorily for the production of a stable thermosetting polymerizable composition because the inhibiting action of such an agent remains in effect during the fabrication of articles from the composition and interferes with polymerization carried out during the fabrication.

However, an inhibiting agent may be used in a moderate amount in a composition embodying the invention to assist in controlling the rate of polymerization during the fabricating operation. When the fabricating operation is carried out at a temperature high enough to prevent air from inhibiting the polymerization, the polymerization may take place quite rapidly so that it may be desirable to have in the composition an amount of inhibiting agent sufficient to cause polymerization to take place at a controllable rate at the temperature to be used for the fabricating operation.

An inhibiting agent in a composition embodying the invention may assist to some extent in rendering the composition stable, but the air diffused throughout the mass must be relied upon principally to render the composition stable because the inhibiting effect of air can be eliminated during the fabricating operation to permit polymerization to take place at a reasonably rapid rate.

In the practice of the invention the polymerizable binder is selected in accordance with the temperature at which the fabricating operation is to be carried out. The binder selected must be such that it has the desired viscosity at the temperature of the fabricating operation. If the viscosity of the binder were not great enough at such temperature it would be squeezed out of the filler or squirted out of the mold. The viscosity of the binder tends to decrease as the temperature increases. When a polymerizable polyester is used as the binder, it should be hard enough at ordinary temperatures so that it will have the desired viscosity at the temperature of the fabricating operation.

The polymerization of an unsaturated polyester is very rapid in the absence of air, but its inhibition by air is extremely pronounced under certain conditions.

A polymerizable unsaturated polyester is prepared by reaction of a polyhydric alcohol with a polybasic acid. It is preferable to employ a dihydric alcohol and a dibasic acid in order to produce a product in which there is a maximum esterification of the acid and alcohol radicals without excessive viscosity. Ordinarily it is desirable that the unsaturated polyester be polymerizable into an infusible or high melting point resin so that the proportion of unsaturated components should be such that the polyester contains an average of more than one double bond per molecule.

The polymerizable unsaturated polyester may be produced by reaction of any desired combination of polybasic acid and polyhydric alcohol. For example, an unsaturated dibasic acid such as maleic, fumaric, itaconic, citraconic or mesaconic acid may be reacted with a dihydric alcohol such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (either in the alpha or beta position), such as monoformin or monoacetin, any monoether of glycerol with a monohydric alcohol, such as monomethylin or monoethylin, or any dihydroxy alkane in which the alcohol radicals are primary or secondary or both, in the series from dihydroxy butane to dihydroxy decane.

Instead of a single polybasic acid, a mixture of polybasic acids may be employed, such as a mixture of an unsaturated dibasic acid with a polybasic acid containing more than two acid radicals, such as citric acid. A mixture of polyhydric alcohols may be employed, such as a mixture of a dihydric alcohol with a polyhydric alcohol containing more than two alcohol radicals, such as glycerol.

In the preparation of the polymerizable unsaturated polyester, any of the usual modifiers such as monobasic acids, monohydric alcohols and natural resin acids may be added. The larger the proportions of monobasic acids and monohydric alcohols, the lower is the average number of acid and alcohol residues in the resulting polyester molecules, and the lower is the viscosity of the polyester. On the other hand, the more nearly equal the molecular proportions of dibasic acid and dihydric alcohol, the greater is the average number of residues in the resulting polyester molecules, and the greater is the viscosity. The proportions of ingredients used are those proportions that produce a polymerizable polyester of the desired viscosity. Other properties of the polyester, such as solubility in various solvents, also may be varied by selecting various reacting ingredients and varying their proportions. The infusibility, hardness and inertness of the product obtained by polymerization of the polyester may be increased by varying the initial reacting ingredients to increase the average number of double bonds per molecule of the polymerizable polyester.

The point to which the reaction of the ingredients is carried in the preparation of the polymerizable polyester is simply that point at which the product has the desired consistency. The consistency or viscosity of the polyester varies directly with the average number of acid and alcohol residues in the molecule. For example, the average number of residues in the molecule of the polyester may vary from about three to about one hundred twenty.

If desired, the reaction may be expedited by use of an acid substance as a catalyst. Any organic acid, inorganic acid or acid salt that is soluble in the reaction mixture may be employed as a catalyst, but it is desirable that any acid substance used be readily volatile or be of such a character that it has no deleterious effect in the final product. The amount of acid catalyst employed is simply that amount which accelerates the esterification to the desired degree.

The reaction is carried out at a temperature high enough and for a time long enough to secure the desired consistency. An elevated temperature preferably is employed to expedite the reaction, but during the preparation of the polyester, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

Any desired anti-oxidant such as hydroquinone, pyrogallol, tannic acid or any aromatic amine, such as iniline or phenylene diamine may be employed as an inhibitor.

The preparation of the unsaturated polyester preferably is carried out in an atmosphere of an inert gas such as carbon dioxide, nitrogen or the like, in order to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because it causes discoloration, but also because it tends to produce premature polymerization at the elevated temperatures used.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

A polymerizable polyester may be prepared by the following procedure:

5.4 mols of maleic anhydride and 5.4 mols of ethylene glycol are mixed together in a three-necked flask. The flask is then fitted with a thermometer, a tube leading to a condenser and an inlet tube through which is introduced a moderate stream of carbon dioxide, and is lowered into an oil bath at a temperature of 210° C. During the subsequent reaction the distillate may be analyzed, and a sufficient amount of the ingredient lost in excess may be added to the flask from time to time to maintain the initial proportions of reacting ingredients. If the only addition is a sufficient amount of the ingredient lost in excess to maintain the initial proportions, the rate of removal of unreacted ingredients gradually decreases and substantially no unreacted ingredients may be left in the composition at the end of the reaction.

Alternatively, this first procedure, as described in the foregoing paragraph, may be employed except that 6 instead of 5.4 mols of maleic anhydride and 6 instead of 5.4 mols of ethylene glycol are employed; a slower stream of carbon dioxide is used; and the ingredients are kept in an oil bath at 220° C. for 5½ hours. The resulting polyester is a very thick gum having an acid number of 53.

The substitution of fumaric acid for maleic anhydride increases the length of time required to reach a given acid number at a given temperature. However, the accelerating effect of an acid catalyst upon the esterification is greater when fumaric acid is used. When fumaric acid is employed, other conditions being the same, the resulting polyester tends to be more viscous and greater care is necessary in order to prevent premature polymerization.

Polymerization of these materials usually is caried out at temperatures of about 160° to 180° F. A composition comprising one or more polymerizable unsaturated polyesters and one or more polymerizable monomeric compounds is particularly useful as a binder. The monomeric compound may be partially polymerized before the ingredients are mixed. Polymerizable monomeric compounds that are useful for the preparation of such a solution include diallyl phthalate, diallyl oxalate, diallyl diglycolate, triallyl citrate, carbonyl bis-(allyl lactate), maleyl bis-(allyl lactate), fumaryl bis-(allyl lactate), succinyl bis-(allyl lactate), adipyl bis-(allyl lactate), sebacyl bis-(allyl lactate), phthalyl bis-(allyl lactate), fumaryl bis-(allyl glycolate), carbonyl bis-(allyl glycolate), carbonyl bis-(allyl salicylate), tetraallyl lactate), adipyl bis-(allyl lactate), sebacyl silicate.

Such a composition, which usually contains about 20 to 30 per cent by weight of the polymerizable monomeric compound and about 70 to 80 per cent by weight of the polymerizable polyester, is particularly advantageous because the polyester has desirable physical properties and hardens very rapidly whereas the presence of the monomeric compound causes the polymerized product to be much more water resistant and insoluble. Moreover, the combination of the polyester and the monomeric compound usually polymerizes more rapidly than either of such substances alone.

A composition comprising a polymerizable polyester is highly advantageous for the molding of articles under pressure. Since a polymerizable polyester is fusible and plastic at a relatively low temperature, it is possible to adjust the amounts of catalyst and inhibiting agent so that hardening at such a temperature takes place at a reasonable rate to allow ample opportunity for shaping and molding of the composition. Shaping and molding may be completed at such a temperature, and the shaped composition may then be held at the same temperature while slow hardening takes place, or may be heated to a higher temperature to cause quick hardening. These properties are in contrast to those of urea-formaldehyde, melamine-formaldehyde and phenol-formaldehyde resins, which are plastic only at elevated temperatures at which they harden so rapidly that hardening interferes with shaping.

Hardening of a polymerizable polyester can be carried out at a temperature that is far below the decomposition temperature of the polyester and thus at a temperature at which discoloration does not take place. Other heat hardenable products, such as urea-, melamine- or phenol-formaldehyde products, must be heated much closer to their decomposition temperatures in order to cause hardening to take place even at moderate speed. When an attempt is made to harden such other products rapidly by raising the hardening temperature, discoloration or "burning" is likely to result.

A polymerizable polyester may be fabricated in an injection molding machine. A supply of the polyester containing the curing catalyst may be held in the supply cylinder of the machine at a temperature at which the composition is highly plastic but hardens very slowly, and the mold may be held at a temperature at which the composition hardens rapidly. Under such conditions the mold may be filled rapidly from the supply cylinder by injection of the composition under pressure. The composition may harden so rapidly at the temperature of the mold that the finished hardened piece may be removed almost immediately after the mold has been filled. Thus very rapid automatic operation of the machine is possible. The only difference between such an operation and the ordinary operation of injection molding a thermoplastic material is that in the injection molding of the polymerizable polyester the mold is at a higher temperature than the supply cylinder, whereas in injection molding of a thermoplastic material the mold is at a lower temperature than the supply cylinder.

Thus a polymerizable polyester can be molded as economically as a thermoplastic material. The molding of other heat hardenable products is a much slower and more expensive operation than the molding of a thermoplastic material.

When the present method is carried out in the production of a molding composition, plasticizers, lubricants, fillers, pigments and other coloring matter may be incorporated if desired.

The preferred catalyst for use in the practice of the invention is benzoyl peroxide but any other organic peroxide such as succinyl peroxide, acetyl peroxide, peracetic acid, perbenzoic acid, toluyl peroxide, p-brom-benzoyl peroxide, anisoyl peroxide, chloroacetyl peroxide and furoyl peroxide or any organic ozonide, such as diisopropylene ozonide, diisobutylene ozonide, or a mixture of such substances, may be used as the curing catalyst.

The proportion of the curing catalyst is simply the proportion that causes the composition to polymerize at the desired rate. The proportion of curing catalyst varies with different catalysts. The proportion of curing catalyst employed to produce a given rate of hardening may vary also with variations in the nature of the polymerizable material.

When a filler is employed, the preferred filler is a cellulosic material. Alpha cellulose is advantageous because it is very pure and white, but any other cellulosic material, such as wood flour, walnut shell flour, chopped fabrics, ground corn cobs or ground newspapers may be employed. Less absorbent fillers that may be used include fine glass fiber, chopped glass cloth or any form of powdered silica such as powdered quartz.

If the binder in a composition embodying the invention comprises a viscous polymerizable substance and a less viscous polymerizable substance, the polymerization catalyst may be dissolved in the less viscous polymerizable substance before the two substances are mixed. If the composition is to contan a filler, however, the polymerization catalyst preferably is dispersed in the filler, as by grinding with the filler in a ball-mill, before the filler is mixed with the binder. A fibrous filler may be impregnated with a solution, in a volatile solvent, of the polymerization catalyst and dried before the filler is mixed with the binder.

It may be necessary to warm the binder to reduce its viscosity when it is mixed with the filler. In any case, it is desirable to mix the binder in a liquid state with the filler so that the filler becomes thoroughly coated or impregnated with the binder.

*Example 1*

Any of the polymerizable binders herein before described whose polymerization is inhibited by air is mixed with a proportion of a finely divided filler sufficient to absorb the binder to an extent such that the impregnated particles of filler do not materially coalesce, to produce a finely divided thermosetting composition that is stable because it has air diffused throughout the mass. Thus 85 parts of such a binder consisting of a very thick gum are mixed with 15 parts by weight of styrene containing in solution one part of benzoyl peroxide. The resulting composition is thoroughly mixed with 100 parts of finely powdered alpha cellulose to produce a powder which remains stable indefinitely when kept in an air-tight container and which can be compression molded at the temperature of 65-70 pounds gauge pressure of steam for 1-5 minutes to produce hard strong articles.

*Example 2*

A polymerizable binder that is hard at ordinary temperatures, whose polymerization is inhibited by air, is prepared as hereinbefore described. If the composition is of a waxy texture and is as hard as common soap at ordinary temperatures, 480 parts of the composition may be placed on warm rubber rolls, and a finely powdered intimate mixture containing 720 parts of alpha cellulose finer than 200 mesh, 10 parts of benzoyl peroxide and 12 parts of zinc palmitate lubricant may be added gradually to the binder on the rubber rolls. After thorough mixing has been completed on the rolls the composition may be unwound from the rolls in sheet form, cooled and then finely ground in a mill having a chopping action. The resulting powder remains stable indefinitely and can be molded like the product of the preceding example.

*Example 3*

A composition is prepared as in Example 2 except that 760 parts of short fiber asbestos of fine standard plastic filler grade is used instead of the 720 parts of powdered alpha cellulose. The result is the same except that the product is not quite as stable as the product of the preceding example. However, the product of the present example may be kept at ordinary temperatures for several months without appreciable deterioration.

Various embodiments of the invention may be devised to meet various requirements.

This is a continuation of application Serial No. 575,732, filed February 1, 1945, and now abandoned.

Having described the invention we claim:

1. A thermosetting composition in stable form, comprising a crystalline polymerizable unsaturated polyhydric alcohol-polycarboxylic acid polyester, and a catalyst of the class consisting of organic peroxides and organic ozonides, in the form of a finely divided dry powder with air diffused throughout the mass.

2. A thermosetting composition in stable form, comprising a fibrous filler impregnated with a crystalline polymerizable unsaturated polyhydric alcohol-polycarboxylic acid polyester, and a catalyst of the class consisting of organic peroxides and organic ozonides, in the form of a finely divided dry powder with air diffused throughout the mass.

3. A thermosetting composition in stable form, comprising a fibrous filler impregnated with (1) a crystalline polymerizable unsaturated polyhydric alcohol-polycarboxylic acid polyester and (2) a catalyst of the class consisting of organic peroxides and organic ozonides, the catalyst being intimately dispersed with respect to the polyester, and the composition being in the form of a finely divided dry powder with air diffused throughout the mass, whereby the filler carries the polyester and the catalyst in contact with air.

WILLIAM C. DEARING.
ARTHUR M. HOWALD.

REFERENCES CITED

The following references are of record in the file of this patent:

UNITED STATES PATENTS

| Number | Name | Date |
|---|---|---|
| 2,255,313 | Ellis | Sept. 9, 1941 |
| 2,457,657 | Glick | Dec. 28, 1948 |
| 2,493,343 | Gerhart | Jan. 3, 1950 |